US012763277B2

(12) United States Patent
Mochizuki et al.

(10) Patent No.: US 12,763,277 B2
(45) **Date of Patent: *Oct. 13, 2026**

(54) FUSE UNIT

(71) Applicant: Yazaki Corporation, Tokyo (JP)

(72) Inventors: Tatsuya Mochizuki, Shizuoka (JP); Kenichi Tanuma, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 215 days.

This patent is subject to a terminal disclaimer.

(21) Appl. No.: 18/667,101

(22) Filed: May 17, 2024

(65) Prior Publication Data

US 2024/0404777 A1 Dec. 5, 2024

(30) Foreign Application Priority Data

May 29, 2023 (JP) ................................ 2023-087491

(51) Int. Cl.
*H01H 85/02* (2006.01)
*H01H 85/044* (2006.01)
*H01M 50/583* (2021.01)

(52) U.S. Cl.
CPC ...... *H01H 85/0241* (2013.01); *H01H 85/044* (2013.01); *H01M 50/583* (2021.01); *H01H 2085/025* (2013.01); *H01M 2200/103* (2013.01)

(58) Field of Classification Search
CPC ............ H01H 85/0241; H01H 85/044; H01H 2085/025; H01H 2085/2075–208; H01M 50/583; H01M 2200/103
See application file for complete search history.

(56) References Cited

U.S. PATENT DOCUMENTS

| | | | | |
|---|---|---|---|---|
| 2010/0019572 A1* | 1/2010 | Kudo | H01H 85/044 | 307/10.7 |
| 2016/0196947 A1* | 7/2016 | Matsumoto | H01H 85/20 | 337/207 |
| 2016/0203935 A1* | 7/2016 | Onoda | H01M 10/4257 | 337/1 |
| 2017/0345601 A1* | 11/2017 | Kitano | H01M 50/581 | |

FOREIGN PATENT DOCUMENTS

JP 6643889 B2 2/2020

* cited by examiner

*Primary Examiner* — Jacob R Crum
(74) *Attorney, Agent, or Firm* — Sughrue Mion, PLLC

(57) ABSTRACT

A fuse unit includes a battery terminal to be electrically connected to a battery post of a battery, a fusible link having a fuse that is electrically connected to the battery terminal and is melted due to overcurrent, and a mounting member to be mounted to the battery, in which the fusible link to which the battery terminal is assembled is arranged. The fusible link is arranged to be movable with respect to the mounting member in a planar direction parallel to a plane from which the battery post of the battery protrudes.

2 Claims, 10 Drawing Sheets

FUSE UNIT

CROSS-REFERENCE TO RELATED APPLICATIONS

The present application is based on, and claims priority from the prior Japanese Patent Application No. 2023-087491, filed on May 29, 2023, the entire contents of which are incorporated herein by reference.

TECHNICAL FIELD

The disclosure relates to a fuse unit.

BACKGROUND

A conventional fuse unit includes a battery terminal and a fusible link. The battery terminal is electrically connected to a battery post of a battery. The fusible link has a fuse to which the battery terminal is electrically connected. The fuse is melted down due to overcurrent. There has been known a fuse unit with a protector which is a mounting member to be mounted to a battery. In the mounting member, the fusible link to which the battery terminal is assembled, is arranged (see JP 6643889 B). In this fuse unit, the protector is mounted to the battery. In the protector, the battery terminal and the fusible link are arranged, and the battery terminal and the fusible link are electrically connected. The battery terminal is electrically connected to a battery post, and the battery and the fusible link are electrically connected via the battery terminal.

SUMMARY OF THE INVENTION

By the way, in a fuse unit such as the fuse unit described in JP 6643889 B, a fusible link is fixed to a mounting member such that the fusible link does not move. The fusible link fixed to the mounting member is electrically connected to a battery by electrically connecting a battery terminal to a battery post. Therefore, in a case where the battery post is located at a different position, the fuse unit cannot be assembled to the battery, and it is necessary to newly design a battery terminal and a mounting member, which reduces versatility.

The disclosure was made in view of the problems of such a conventional technique. An object of the disclosure is to provide a fuse unit capable of improving versatility.

According to an aspect of the embodiment, there is provided a fuse unit including: a battery terminal to be electrically connected to a battery post of a battery; a fusible link having a fuse that is electrically connected to the battery terminal and is melted due to overcurrent; and a mounting member to be mounted to the battery, in which the fusible link to which the battery terminal is assembled is arranged, wherein the fusible link is arranged to be movable with respect to the mounting member in a planar direction parallel to a plane from which the battery post of the battery protrudes.

According to the embodiment, it is possible to provide a fuse unit capable of improving versatility.

DETAILED DESCRIPTION OF THE INVENTION

Figure 1:
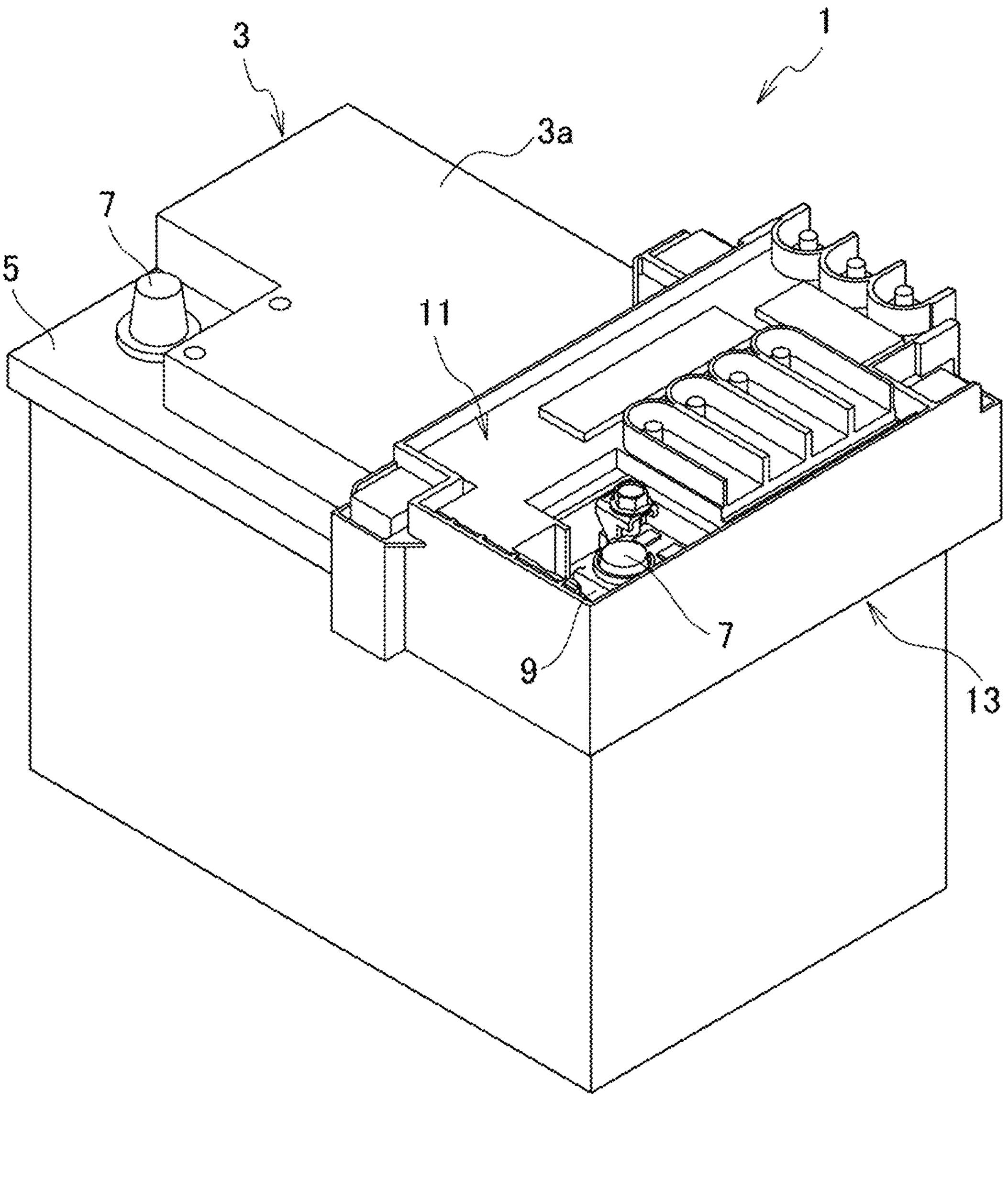
FIG. 1 is a perspective view of a fuse unit according to the present embodiment.
Figure 2:
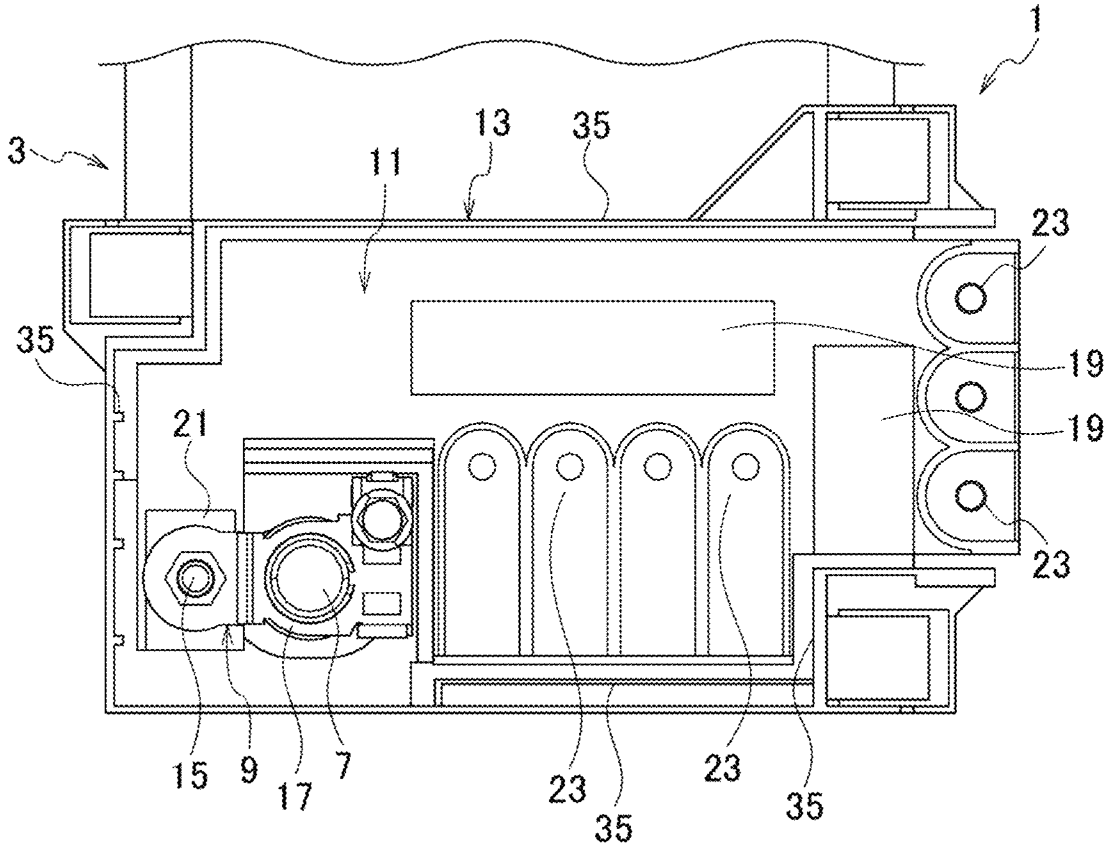
FIG. 2 is a top view of the fuse unit according to the present embodiment.

A fuse unit according to the present embodiment will be described below with reference to the accompanying drawings in detail. Note that the dimensional proportions in the drawings are exaggerated for the sake of explanation and may differ from the actual proportions.

As illustrated in FIG. 1, a fuse unit 1 according to the embodiment is applied, for example, to a battery 3 installed in a vehicle. The fuse unit 1 is arranged between the battery 3 and an electrical component (not illustrated) installed in the vehicle. When an overcurrent flows, the fuse unit 1 cuts off power supply from the battery 3 to the electrical component, which protects the electrical component.

As illustrated in FIGS. 1 to 5, the battery 3 is formed in a rectangular parallelepiped shape, and has two recess portions 5 formed by cutting out two corners of an upper surface **3*a* of the battery 3 such that the two recess portions are lower by one step than the upper surface 3*a*. Within each recess portion 5 of the battery 3, a battery post 7 protruding upwardly from a bottom surface of the recess portion 5, is provided. The fuse unit 1 is electrically connected to the battery post 7**.

As illustrated in FIGS. 1 to 10, the fuse unit 1 includes a battery terminal 9, a fusible link 11, and a mounting member 13.

As illustrated in FIGS. 1 to 3 and FIG. 6, the battery terminal 9 is made of conductive material, and has a link connection portion 15 and a battery connection portion 17.

The link connection portion 15 consists of a stud bolt protruding upwardly on one end side of the battery terminal 9. The link connection portion 15 is electrically connected to the fusible link 11 such that the battery terminal 9 is electrically connected to the fusible link 11.

The battery connection portion 17 has a hole part through which the battery post 7 can be inserted. A diameter of the hole part is reduced by tightening a bolt inserted in an end of the battery connection portion 17. The battery connection portion 17 is electrically connected to the battery post 7 by tightening the bolt in a state where the battery post 7 is inserted into the hole part. By electrically connecting the battery connection portion 17 to the battery post 7, the fusible link 11 is electrically connected to the battery 3 via the battery terminal 9.

As illustrated in FIGS. 1 to 3 and FIGS. 6 to 8, the fusible link 11 is formed in a rectangular shape and molded by synthetic resin, with a fuse element made of conductive material in which a fuse (not illustrated) that can be melted due to overcurrent is provided. A portion of the fusible link 11 where the fuse is located, has an opening through which a state of the fuse can be checked. The opening is closed by a cover 19. The fusible link 11 has a terminal connection portion 21 and component connection portions 23.

The terminal connection portion 21 is provided on one side of the fusible link 11 in a longitudinal direction of the fusible link 11. The terminal connection portion 21 consists of a hole part penetrated through the fuse element exposed from the synthetic resin. The link connection portion 15 of the battery terminal 9 is inserted into the terminal connection portion 21. The fusible link 11 is electrically connected to the battery terminal 9 by fastening a nut to the link connection portion 15.

The component connection portions 23 are provided on a center part of the fusible link 11 in the longitudinal direction of the fusible link 11 (four in this embodiment), and is provided on the other side of the fusible link 11 in the longitudinal direction of the fusible link 11 (three in this embodiment). Insulations among the component connection portions 23 are maintained by compartment walls made of synthetic resin. The component connection portions 23 consists of stud bolts protruding upwardly from a surface of the fuse element exposed from the synthetic resin. One of the component connection portions 23 is inserted into a terminal provided on the end of an electric wire electrically connected to the electrical component, for example, and the one of the component connection portions 23 is electrically connected to the electrical component by fastening a nut. By electrically connecting the electrical component to the one of the component connection portions 23, the battery 3 is electrically connected to the electrical component via the fusible link 11.

When the battery 3 is electrically connected to electric components via the fusible link 11, the fusible link 11 supplies an electric power of the battery 3 to the respective electrical components. If an overcurrent is input to the fuse element, the fuse is melted to cut off the power supply between the battery 3 and the electrical components, thereby protecting the electrical components. The fusible link 11 to which the battery terminal 9 is assembled is arranged in the mounting member 13.

As illustrated in FIGS. 1 to 6 and FIGS. 9, 10, the mounting member 13 is made of an insulating material such as synthetic resin, and is formed in a shape of a rectangular housing that can accommodate the fusible link 11. The mounting member 13 is open on an upper surface side thereof so as to accommodate the battery terminal 9 and the fusible link 11. The opening on the upper surface side of the mounting member 13 is closed by a cover (not illustrated). The mounting member 13 is provided with a plurality of cover locking parts (not illustrated) that hold a state where the cover is assembled to the mounting member 13. Battery locking portions 29 that are to be engaged with locked portions 27 provided on the battery 3, is provided on a lower surface side of the mounting member 13. By engaging the battery locking portions 29 with the locked portions 27, the mounting member 13 does not move with respect to the battery 3 and a state where the mounting member 13 is assembled to the battery 3 can be held. The mounting member 13 has a link arrangement portion 31, a terminal arrangement portion 33, and regulation portions 35.

The link arrangement portion 31 is located adjacent to the terminal arrangement portion 33 and above the terminal arrangement portion 33. The component connection portions 23 of the fusible link 11 is arranged in the link arrangement portion 31. The component connection portions 23 of the fusible link 11 arranged in the link arrangement portion 31 is movable in the link arrangement portion 31 in a planar direction parallel to a plane from which the battery post 7 of the battery 3 protrude.

The terminal arrangement portion 33 is located adjacent to the link arrangement portion 31 and lower than the link arrangement portion 31. The terminal connection portion 21 of the fusible link 11 and the battery terminal 9 assembled to the terminal connection portion 21 are arranged in the terminal arrangement portion 33. The terminal connection portion 21 of the fusible link 11 and the battery terminal 9 arranged in the terminal arrangement portion 33 are movable in the terminal arrangement portion 33 in the planar direction parallel to the plane from which the battery post 7 of the battery 3 protrude. A hole part 37 through which the battery post 7 of the battery 3 is to be inserted, is provided on a bottom surface of the terminal arrangement portion 33. A size of the hole part 37 is larger than an outer diameter of the battery post 7 such that the battery post 7 can be inserted even if the battery post 7 is located at a different position. The battery post 7 inserted through the hole part 37 in a state where the mounting member 13 is assembled to the battery 3, is arranged in the terminal arrangement portion 33. The battery connection portion 17 of the battery terminal 9 is electrically connected to the battery post 7 arranged in the terminal arrangement portion 33.

The regulation portions 35 are provided in a plurality of locations (four in this embodiment) on a peripheral wall that demarcates an outer edge of the mounting member 13. The regulation portions 35 are provided at positions to face at least all four side surfaces of the fusible link 11 formed in the rectangular shape. A part of the regulation portions 35 comes in contact with a part of the side surfaces of the fusible link 11 when the fusible link 11 is moved in the planar direction in the mounting member 13. The contact between the part of the regulating portions 35 and the part of the side surfaces of the fusible link 11 prevents the fusible link 11 from moving further in the planar direction to regulate the movement of the fusible link 11. Therefore, the movement of the battery terminal 9 can be regulated with respect to the battery post 7, and a reliability of the electrical connection between the battery 3 and the battery terminal 9 can be maintained.

The fusible link 11 to which the battery terminal 9 arranged in the mounting member 13 is assembled, can be moved in the planar direction parallel to the plane from which the battery post 7 of the battery 3 protrudes. If the battery post 7 is located at a different position, the battery terminal 9 can be electrically connected to the battery post 7 by moving the fusible link 11 with respect to the mounting member 13. Therefore, it is not necessary to newly design the battery terminal 9 and the mounting member 13, and the same fuse unit 1 can be assembled to various kinds of batteries 3 with battery posts 7 located at different positions, thus improving versatility.

Figure 11:
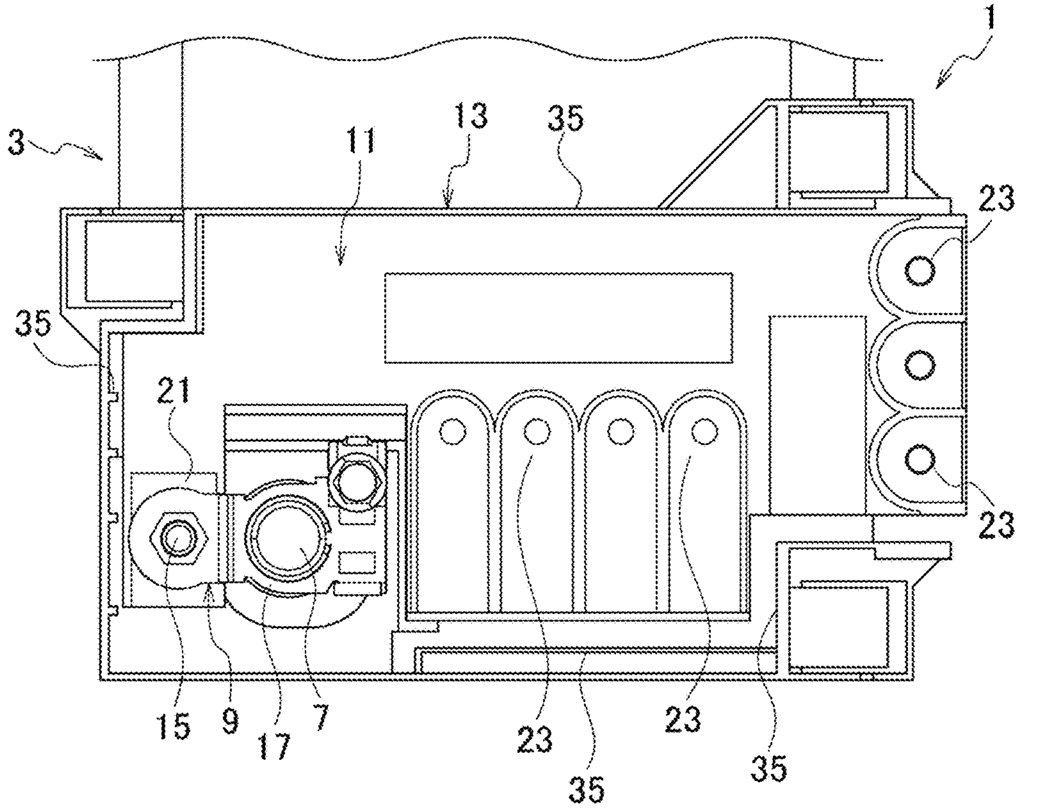
FIG. 11 is a top view when the fusible link of the fuse unit according to the present embodiment is moved to an upper left in a planar direction relative to the mounting member.

For example, as illustrated in FIG. 11, if the location of the battery post 7 with respect to the battery 3 is an upper left in the plane from which the battery post 7 of the battery 3 protrudes, the fusible link 11 is moved to be located at an upper left in the planar direction with respect to the mounting member 13. At this time, a part of the side surfaces of the fusible link 11 comes in contact with the regulation portion 35 located on a left side of the mounting member 13 in the planar direction and the regulation portion 35 located on an upper side of the mounting member 13 in the planar direction, and further movement of the fusible link 11 is regulated.

Figure 12:
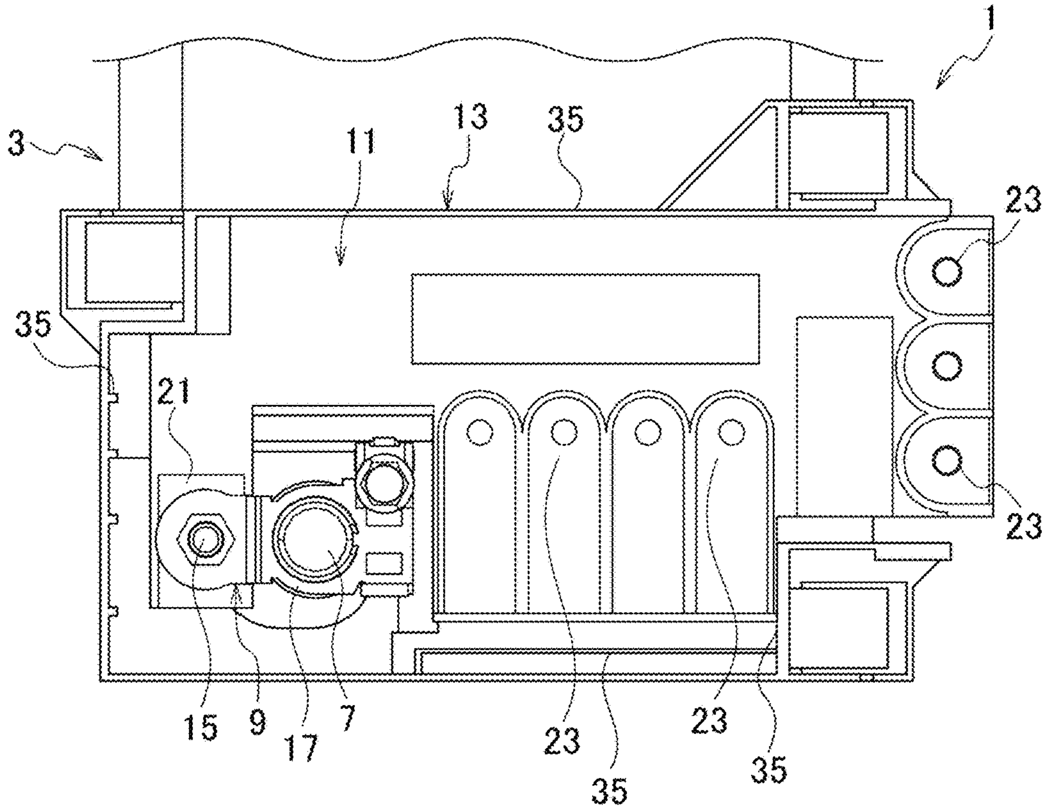
FIG. 12 is a top view when the fusible link of the fuse unit according to the present embodiment is moved to an upper right in the planar direction relative to the mounting member.

As illustrated in FIG. 12, if the location of the battery post 7 with respect to the battery 3 is an upper right in the plane from which the battery post 7 of the battery 3 protrudes, the fusible link 11 is moved to be located at an upper right in the planar direction with respect to the mounting member 13. At this time, a part of the side surfaces of the fusible link 11 comes in contact with the regulation portion 35 located on a right side of the mounting member 13 in the planar direction and the regulation portion 35 located on the upper side of the mounting member 13 in the planar direction, and further movement of the fusible link 11 is regulated.

Figure 13:
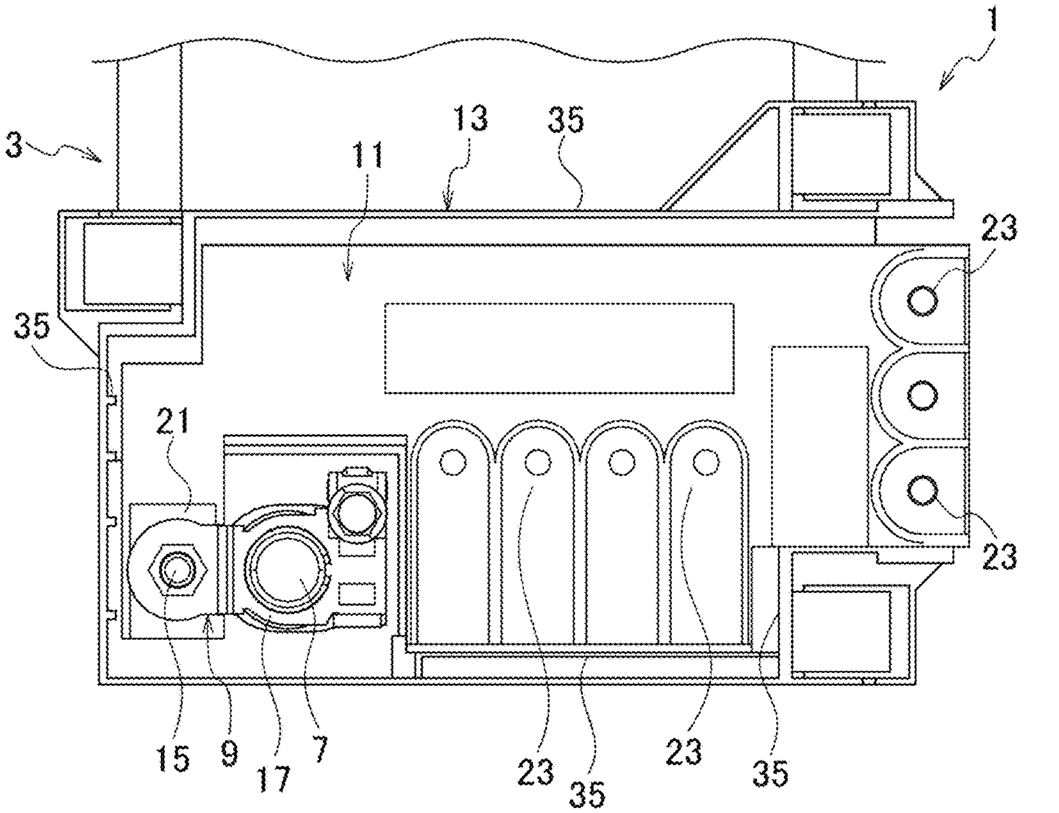
FIG. 13 is a top view when the fusible link of the fuse unit according to the present embodiment is moved to a lower left in the planar direction relative to the mounting member.

As illustrated in FIG. 13, if the location of the battery post 7 with respect to the battery 3 is a lower left in the plane from which the battery post 7 of the battery 3 protrudes, the fusible link 11 is moved to be located at a lower left in the planar direction with respect to the mounting member 13. At this time, a part of the side surfaces of the fusible link 11 comes in contact with the regulation portion 35 located on the left side of the mounting member 13 in the planar direction and the regulation portion 35 located on a lower side of the mounting member 13 in the planar direction, and further movement of the fusible link 11 is regulated.

Figure 14:
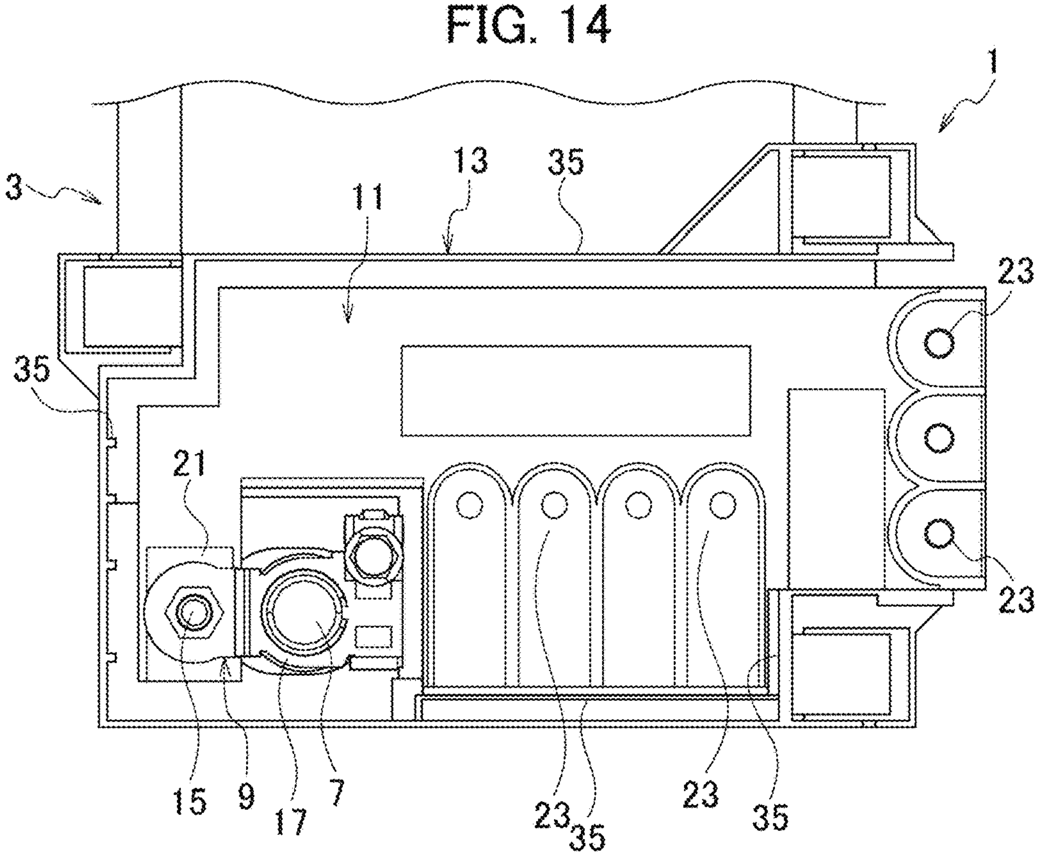
FIG. 14 is a top view when the fusible link of the fuse unit according to the present embodiment is moved to a lower right in the planar direction relative to the mounting member.

As illustrated in FIG. 14, if the location of the battery post 7 with respect to the battery 3 is a lower right in the plane from which the battery post 7 of the battery 3 protrudes, the fusible link 11 is moved to be located at a lower right in the planar direction with respect to the mounting member 13. At this time, a part of the side surfaces of the fusible link 11 comes in contact with the regulation portion 35 located on the right side of the mounting member 13 in the planar direction and the regulation portion 35 located on the lower side of the mounting member 13 in the planar direction, and further movement of the fusible link 11 is regulated.

Figure 3:
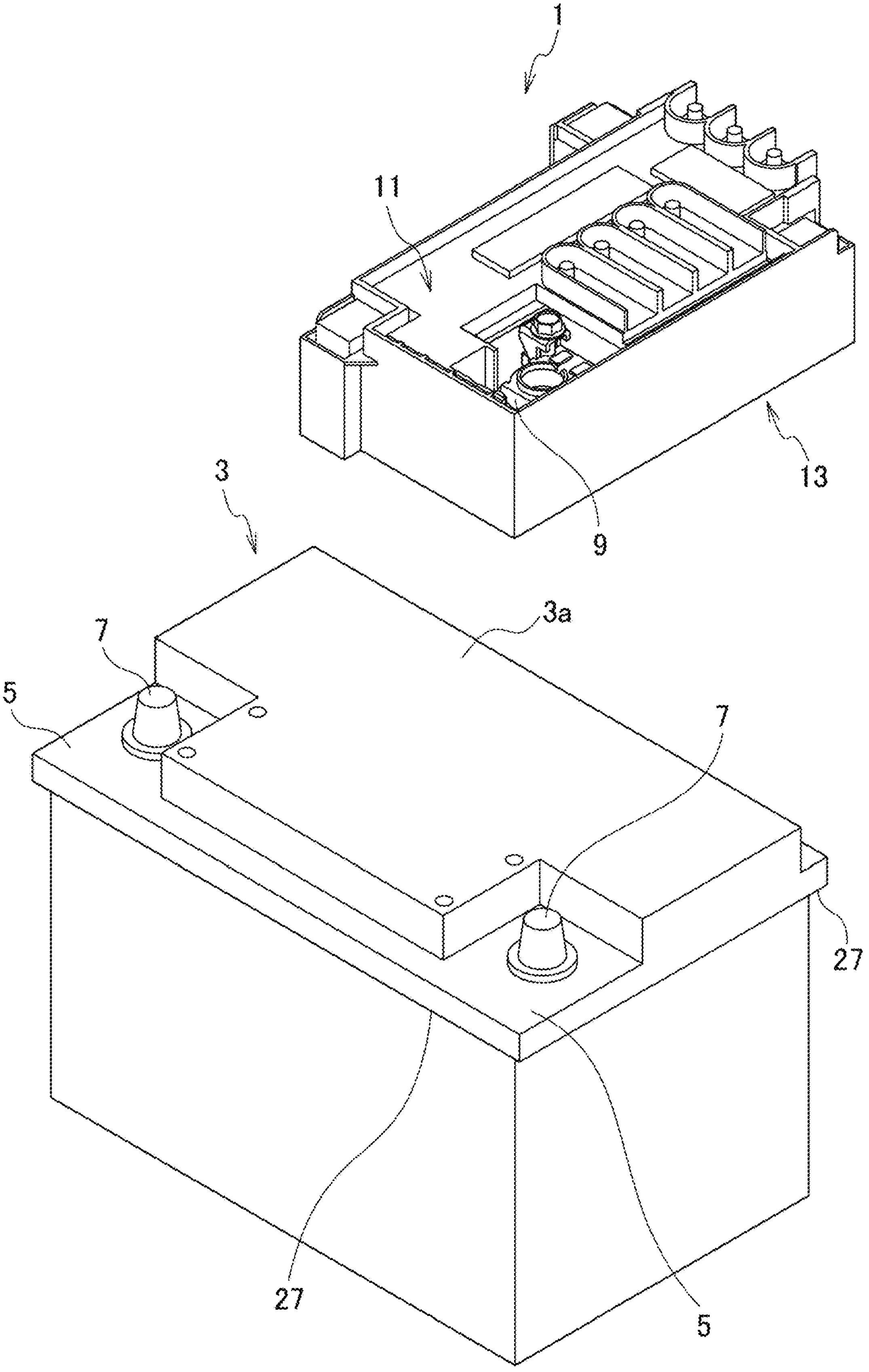
FIG. 3 is a perspective view of the fuse unit according to the present embodiment when the fuse unit is being assembled to a battery.
Figure 4:
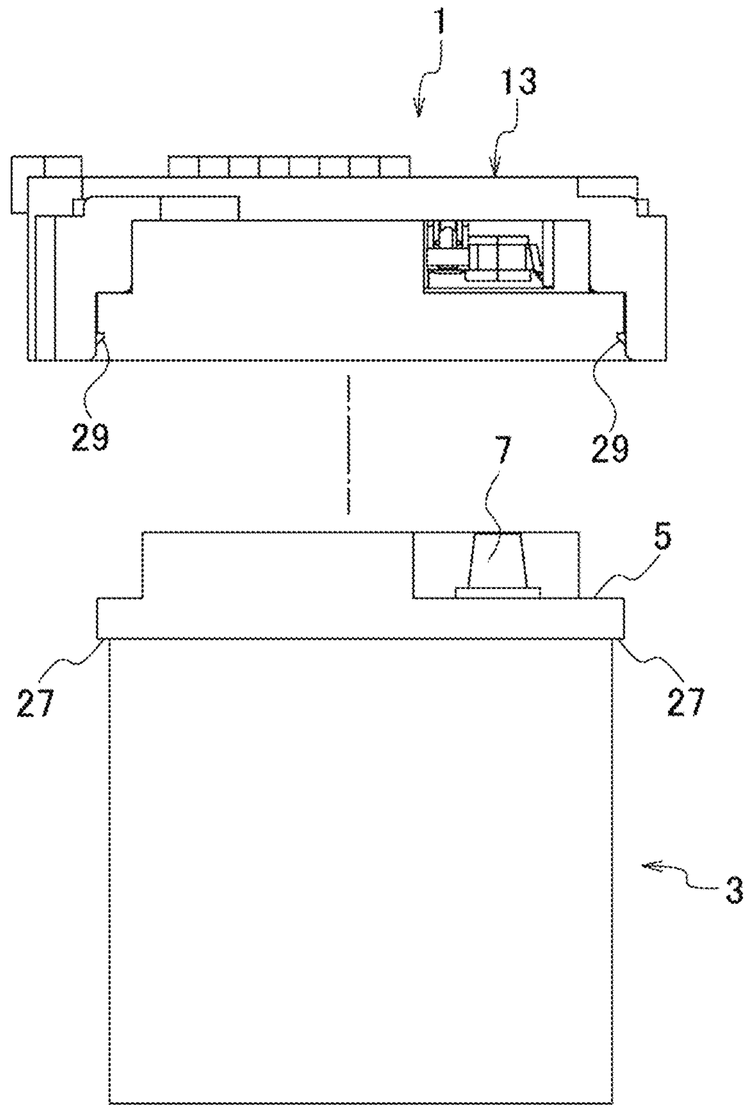
FIG. 4 is a side view of the fuse unit according to the present embodiment when the fuse unit is being assembled to the battery.
Figure 5:
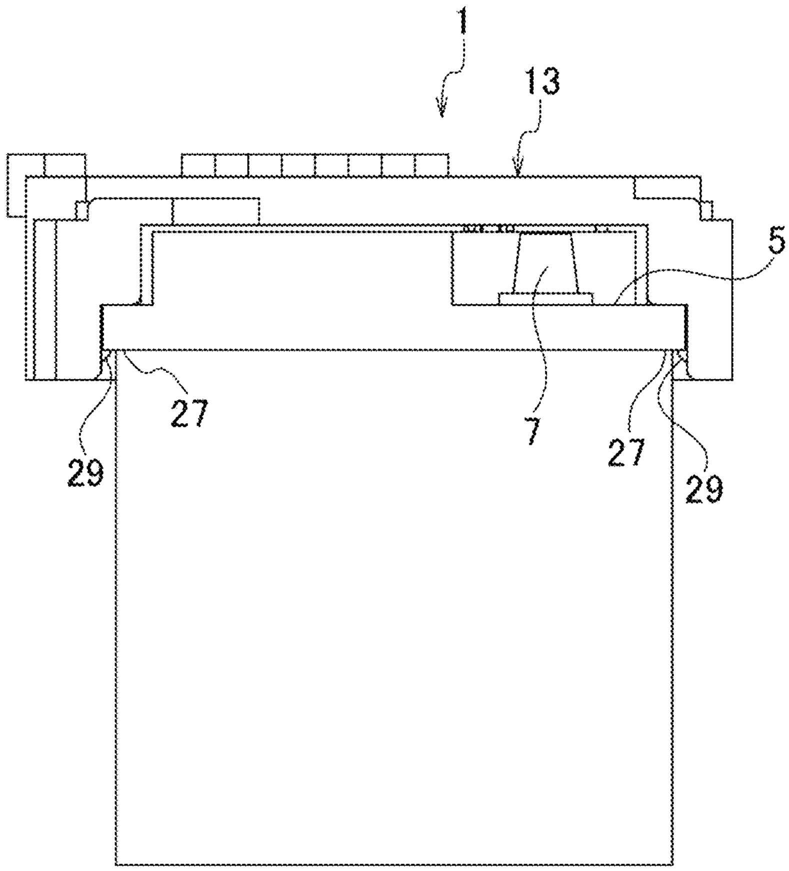
FIG. 5 is a side view of the fuse unit according to the present embodiment when the fuse unit is assembled to the battery.
Figure 6:
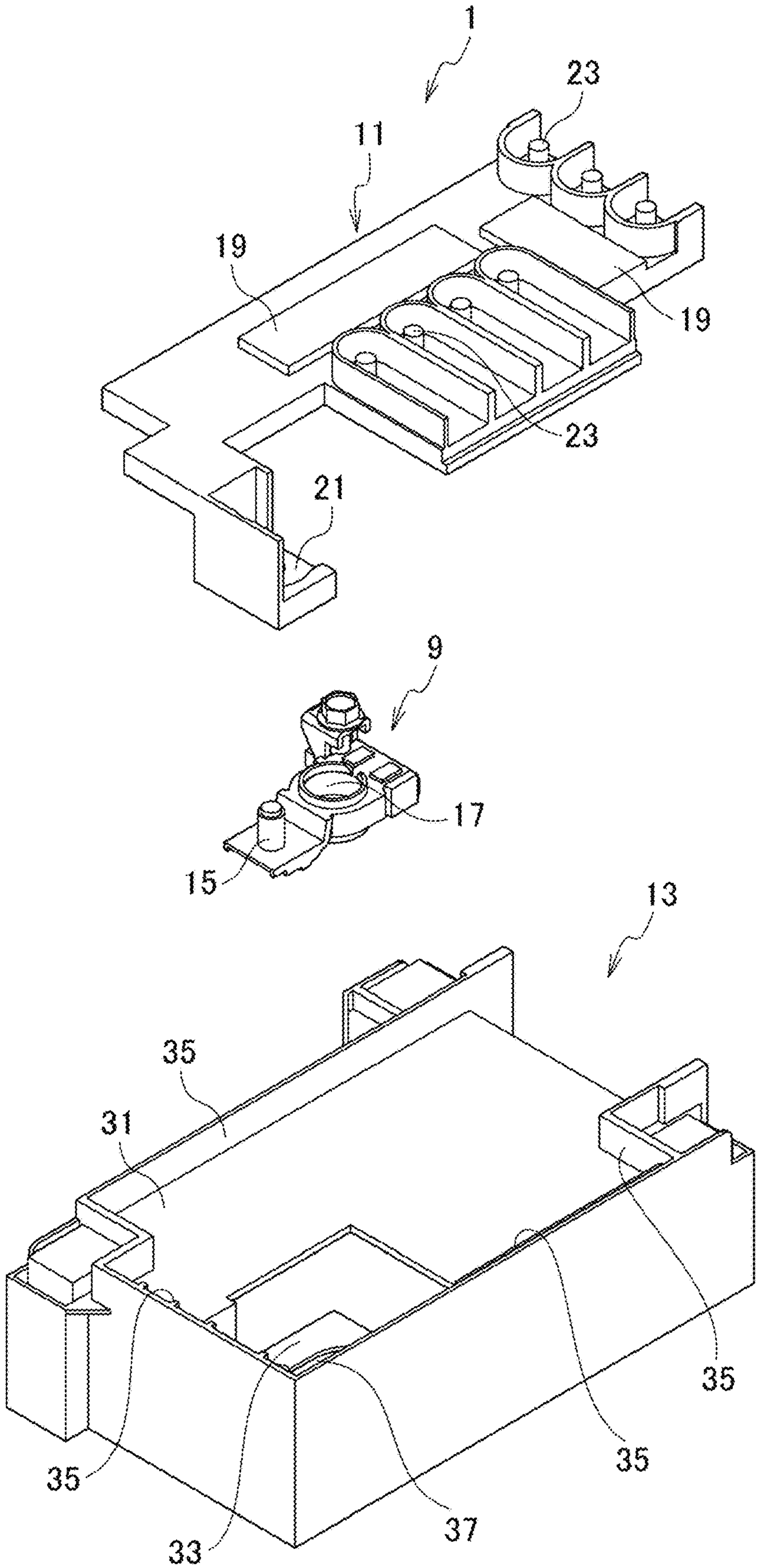
FIG. 6 is an exploded perspective view of the fuse unit according to the present embodiment.
Figure 7:
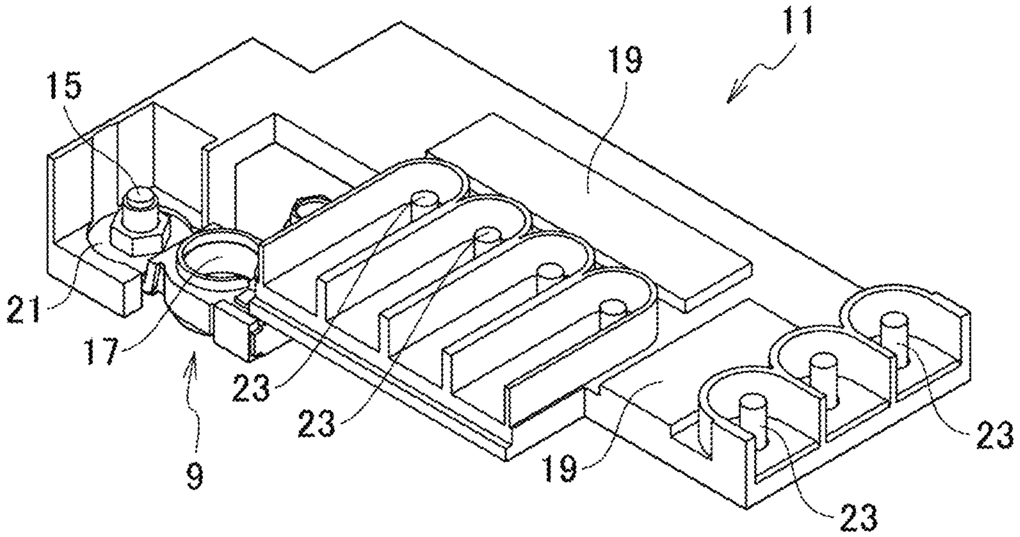
FIG. 7 is a perspective view of a fusible link of the fuse unit according to the present embodiment.
Figure 8:
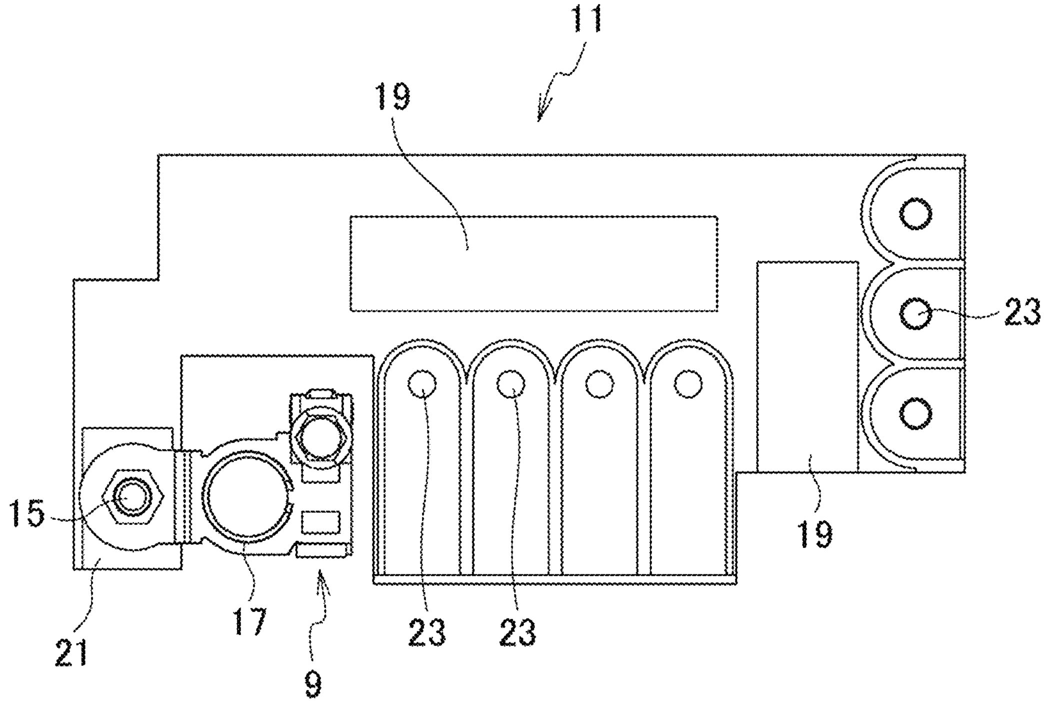
FIG. 8 is a top view of the fusible link of the fuse unit according to the present embodiment.
Figure 9:
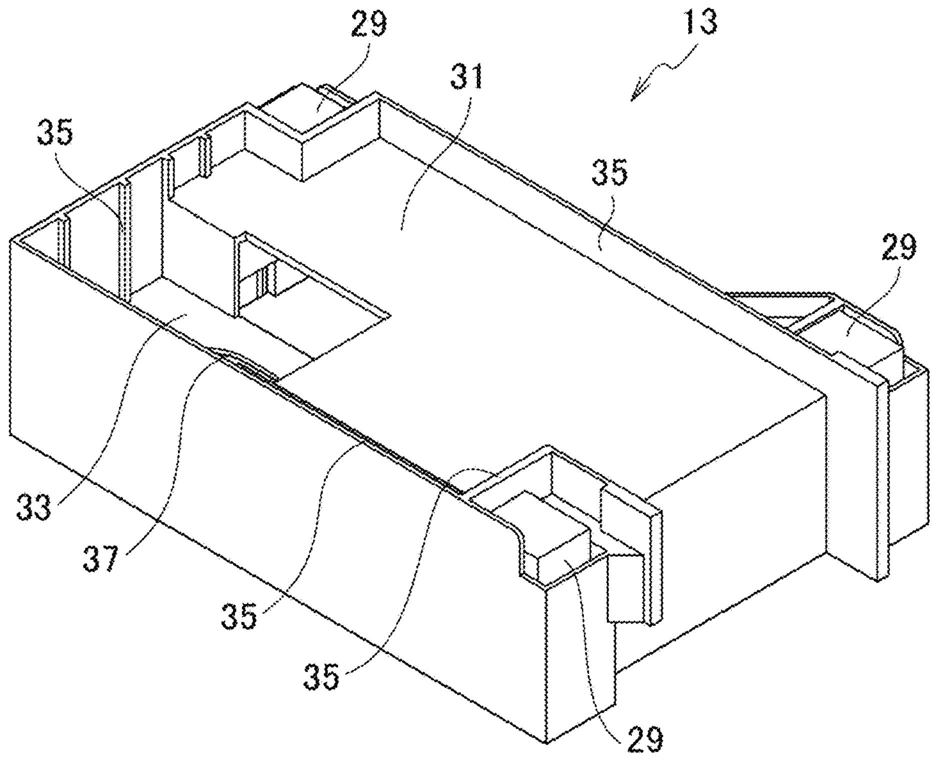
FIG. 9 is a perspective view of a mounting member of the fuse unit according to the present embodiment.
Figure 10:
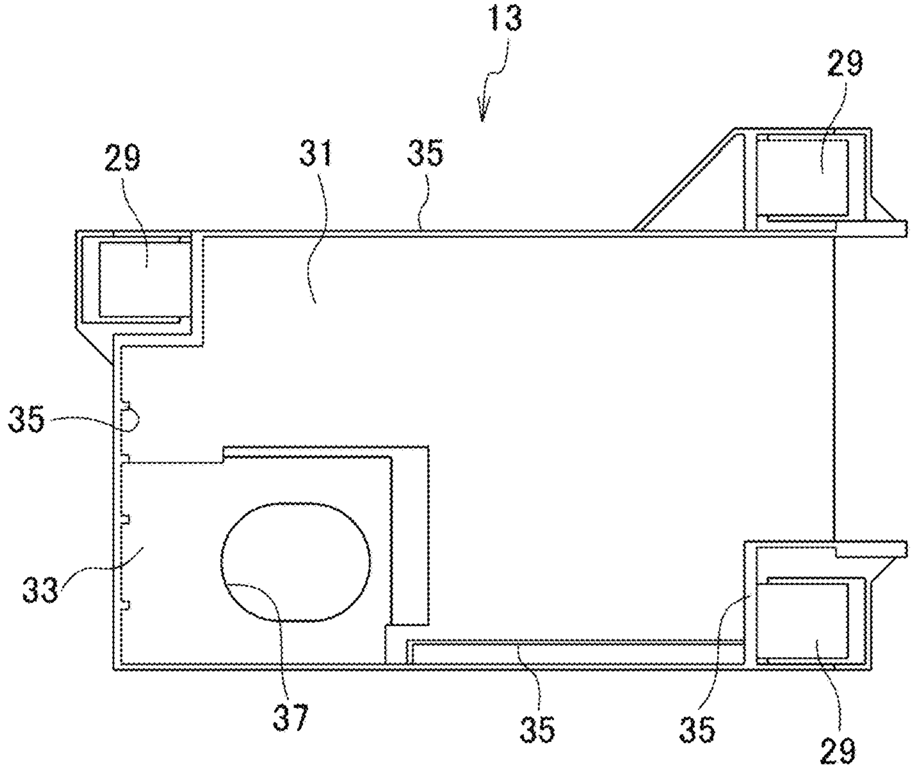
FIG. 10 is a top view of the mounting member of the fuse unit according to the present embodiment.

Note that in the embodiment, the upper left in the plane from which the battery post 7 of the battery 3 protrudes, corresponds to a position in the plane near the upper surface 3*a* of the battery 3 in a long side direction of the battery 3 and far from the upper surface 3*a* of the battery 3 in a short side direction of the battery 3 (see FIGS. 3 and 11). The upper right in the plane from which the battery post 7 of the battery 3 protrudes, corresponds to a position in the plane near the upper surface 3*a* of the battery 3 in the long side direction of the battery 3 and near the upper surface 3*a* of the battery 3 in the short side direction of the battery 3 (see FIGS. 3 and 12). The lower left in the plane from which the battery post 7 of the battery 3 protrudes, corresponds to a position in the plane far from the upper surface 3*a* of the battery 3 in the long side direction of the battery 3 and far from the upper surface 3*a* of the battery 3 in the short side direction of the battery 3 (see FIGS. 3 and 13). The lower right in the plane from which the battery post 7 of the battery 3 protrudes, corresponds to a position far from the upper surface 3*a* of the battery 3 in the long side direction of the battery 3 and near the upper surface 3*a* of the battery 3 in the short side direction of the battery 3 (see FIGS. 3 and 14).

The fuse unit 1 includes the battery terminal 9 that is electrically connected to the battery post 7 of the battery 3, and the fusible link 11 having a fuse that is electrically connected to the battery terminal 9 and is melted due to overcurrent. The fuse unit 1 includes the mounting member 13 that is mounted to the battery 3. In the mounting member 13, the fusible link 11 to which the battery terminal 9 is assembled is arranged. The fusible link 11 is arranged to be movable with respect to the mounting member 13 in the planar direction parallel to the plane from which the battery post 7 of the battery 3 protrudes.

Even when the battery post 7 is located at a different position, the battery terminal 9 can be electrically connected to the battery post 7 by moving the fusible link 11 with respect to the mounting member 13. Therefore, it is not necessary to newly design the battery terminal 9 and the mounting member 13, and the same fuse unit 1 can be assembled to various kinds of batteries 3 with battery posts 7 located at different positions, thus improving versatility.

Thus, the fuse unit 1 can improve versatility.

The mounting member 13 has the regulation portions 35 that can come in contact with the fusible link 11 when the fusible link 11 moves.

This allows the battery terminal 9 to be regulated to move with respect to the battery post 7, thus maintaining the reliability of the electrical connection between the battery 3 and the battery terminal 9.

Although the embodiment has been described, the embodiment is not limited to these descriptions. Various modifications are possible within the scope of the gist of this embodiment.

For example, the mounting member may be provided with a locking portion that prevents the fusible link from separating from the mounting member upwardly. The locking portion may, for example, have a protrusion facing an upper surface of the fusible link, and the protruding length of the protrusion may be set such that the protrusion always faces the upper surface of the fusible link in a range of movement of the fusible link.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A fuse unit comprising:

a battery terminal to be electrically connected to a battery post of a battery;

a fusible link having a fuse that is electrically connected to the battery terminal and is melted due to overcurrent; and a mounting member to be mounted to the battery, in which the fusible link to which the battery terminal is assembled is arranged, wherein the fusible link is arranged to be movable within the mounting member in a planar direction parallel to a plane from which the battery post of the battery protrudes, before the battery terminal is electrically connected to the battery post.

2. The fuse unit according to claim 1, wherein the mounting member is provided with a regulation portion that can come in contact with the fusible link when the fusible link moves.

* * * * *